Nov. 19, 1968    G. L. LOVING ETAL    3,411,600
INTEGRATED TRACTOR AND TRAILER OF THE SEPARABLE TYPE
Filed July 7, 1966    3 Sheets-Sheet 1
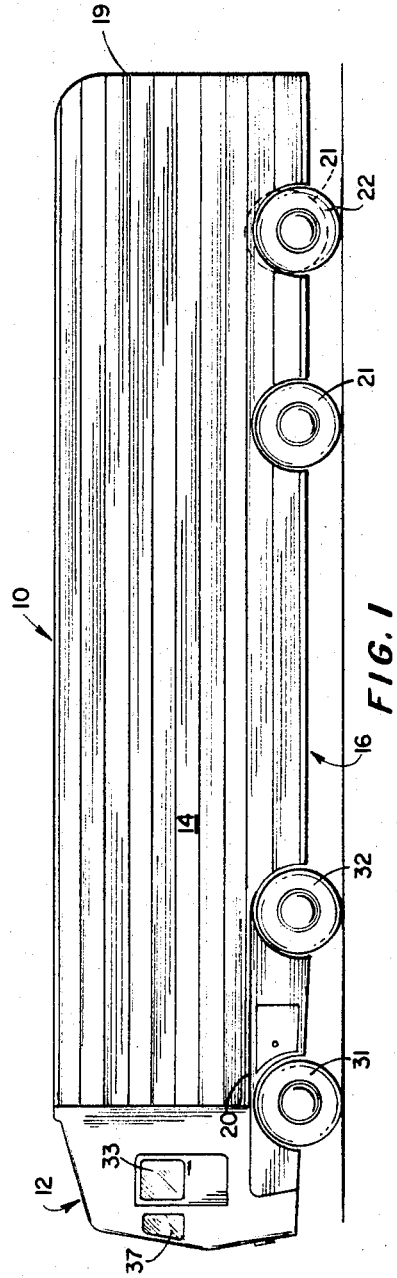
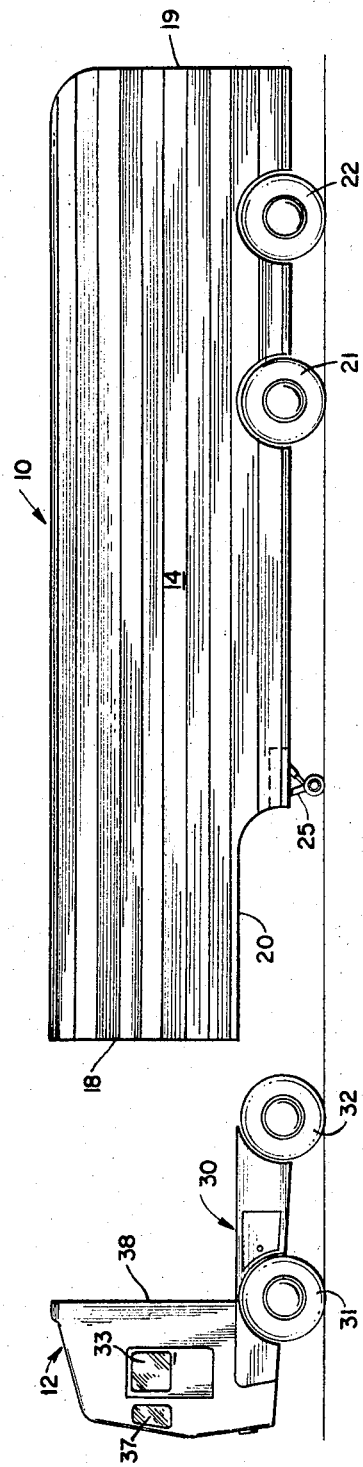
INVENTORS
GEORGE L. LOVING
WALTER P. LESTOQUE
BY
Richard D. Law
ATTORNEY Nov. 19, 1968  G. L. LOVING ET AL  3,411,600
INTEGRATED TRACTOR AND TRAILER OF THE SEPARABLE TYPE
Filed July 7, 1966  3 Sheets-Sheet 2
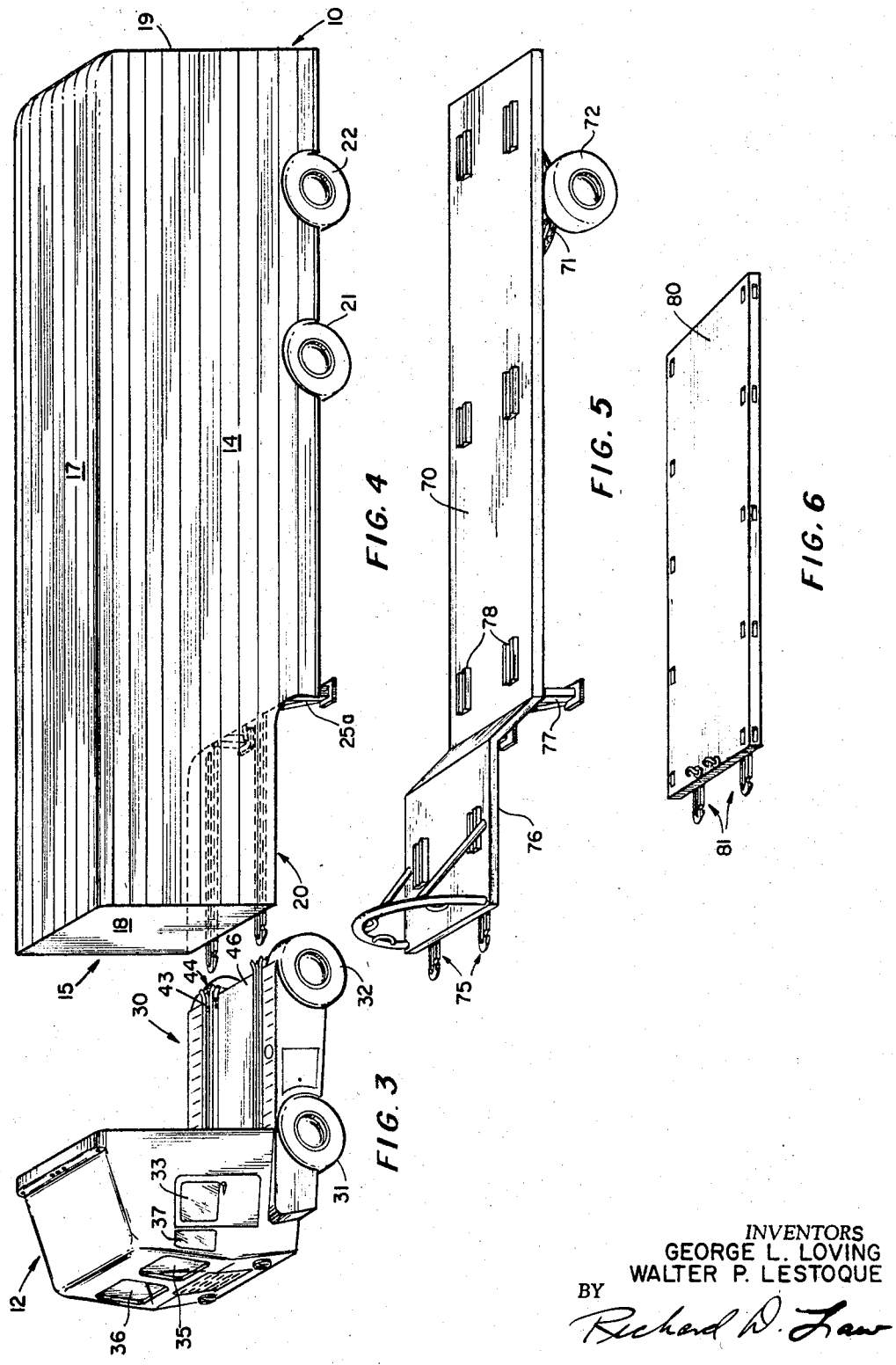
INVENTORS
GEORGE L. LOVING
WALTER P. LESTOQUE
BY
Richard D. Law
ATTORNEY

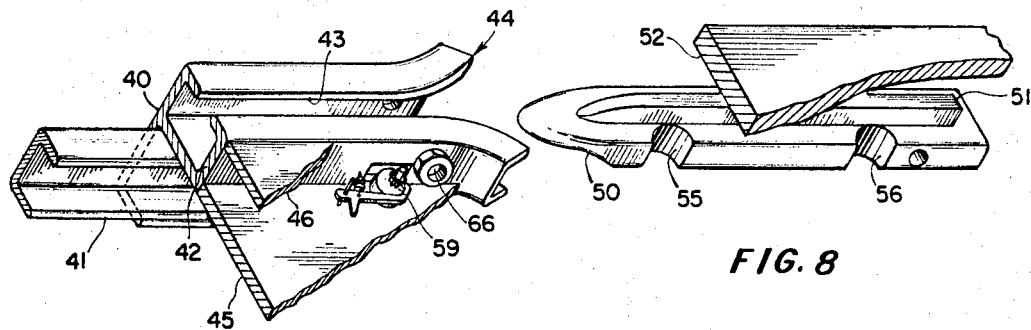
FIG. 7
FIG. 8
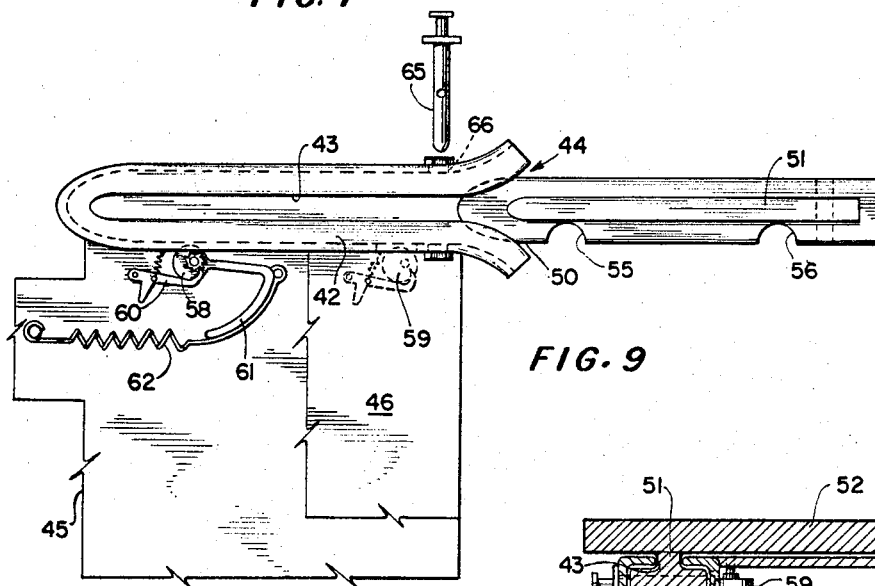
FIG. 9
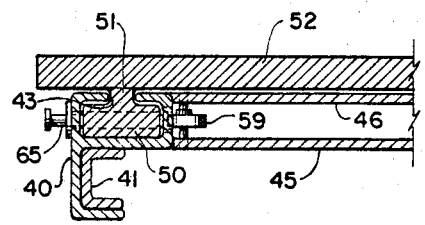
FIG. 10
INVENTORS
GEORGE L. LOVING
WALTER P. LESTOQUE
BY
Richard D. Law
ATTORNEY United States Patent Office 3,411,600
Patented Nov. 19, 1968

3,411,600
INTEGRATED TRACTOR AND TRAILER OF THE SEPARABLE TYPE
George L. Loving, Denver, and Walter P. Lestoque, Aurora, Colo., assignors to The American-Coleman Company, Littleton, Colo., a corporation of Nebraska
Filed July 7, 1966, Ser. No. 563,500
7 Claims. (Cl. 180—14)

ABSTRACT OF THE DISCLOSURE

An integrated tractor and trailer having a self-contained prime mover and a detachable follow frame with means for rigidly attaching the two together, including forwardly extending runner portions integral with the trailer frame and telescoping into mating open top channel members mounted on the frame of the tractor. A support member, extending above the runner portions, guides each runner into the channel, and cam locks secure the parts tightly together.

This invention relates to a rigid integrated tractor and trailer which are arranged to be separable but when connected together form an integrated tractor and cargo trailer combination.

Commercial transportation of goods by rubber-tired vehicles has been accomplished in several ways, including standard trucks with flat bed, van, and dump body designs, as well as specialized vehicles such as pallet movers, lumber straddle haulers, cargo and tire vehicles, and such combination vehicles typified by a tractor with a trailer, tractor with a semi-trailer, tractor-trailer-pup, and truck with various trailer combinations, etc. These types of vehicles are well known in the art and are adequately described under "Commercial Motor Vehicle Nomenclature," SAE J687a, a standard of the Society of Automotive Engineers.

In the copending application, referred to above, there is described a large capacity integrated tractor and trailer in which the tractor or prime mover is fully integrated with the trailer, forming a non-articulated, single unit without the use of conventional king pin or fifth wheel connection between the two components. The resulting unit provides superior qualities over conventional tractor and trailer units having the king pin or fifth wheel connection therebetween. The present invention relates to a design concept which combines the safety and utility of a standard transport truck, particularly of the large capacity vehicles described in the copending application, but includes the further advantage of cost saving and versatility of such combination vehicles as tractors and trailers or semi-trailers in common use. In all commercial transportation, use, time, cost, and safety are primary factors for consideration in the employment of the units necessary in freight hauling. A standard transport truck, that is, a conventional tractor with attached cargo carrying body, affords utility by virtue of its relatively large cargo area or volume in relation to its overall dimensions, and additionally provides an extra margin of safety due to its having a rigid frame for both tractor body and cargo body which is not subject to such hazards (jackknifing, poor visibility, etc.) associated with combination vehicles. The combination vehicles, on the other hand, offer high versatility in transporting various goods in that one tractor or prime mover may tow various types of specialized trailers or semi-trailers since the tractor may be released from the trailer. This pemits a substantial saving of down time for the prime mover when a trailer is in the process of being loaded or unloaded, as it is not necessary for the truck or tractor to remain with the trailer, permitting the use of the prime mover and the driver for other duties.

The present invention includes a self-contained prime mover and a detachable follow frame which is arranged to be rigidly attached to the prime mover. The self-contained prime mover is (1) capable of independent locomotion and steering, (2) has an engine, power train, steering system, driver compartment, and all other devices and equipment normally and legally required of a motor vehicle, and (3) a mechanism by which the self-contained prime mover can be integrally coupled to and preclude relative motion with a cargo supporting follow frame. In one embodiment a follow frame is cantilevered from the self-contained prime mover for ease of placing and leaving such a frame on the dock, and another embodiment provides a follow frame with a rear axle or a combination of rear axles as dictated by the type and weight of cargo. The follow frame, when so equipped with a rear axle or axles, will require a landing gear to support the forward end of the follow frame when the self-contained prime mover is detached, the implementation of landing gears is well known in trailer applications. In addition, when the follow frame is equipped with an axle or axles, both the front and rear axles of the self-contained prime mover are steerable and at least one is driven to prevent scuffing of the tire on the follow frame. Furthermore, when the follow frame is equipped with a single axle it may be steerable (under controlled conditions), or when two axles are used one axle may be steerable and the other retractable to provide for increased mobility and prevent tire scuffing. The self-contained prime mover may be equipped with quick disconnect air, hydraulic and electric lines, as may be required by the configuration of the follow frame, such disconnects are common in the truck transport industry.

Included among the objects and advantages of the present invention are separable tractor and trailer units arranged for integral connection therebetween forming a substantially rigid body and frame, but which are detachable from each other when required.

Another object of the invention is to provide structure for forming a rigid connection between a tractor and a follow frame.

Additional objects and advantages of the invention may be readily ascertained by referring to the following description and appended illustrations in which:

FIG. 1 is a generally schematic side elevational view of a tractor and trailer according to the invention assembled in integrated position;

FIG. 2 is a side elevational view, generally schematic, of a disassembled tractor and trailer according to the invention;

FIG. 3 is a schematic perspective view of a tractor according to the invention;

FIG. 4 is a perspective view of a follow frame according to the invention;

FIG. 5 is a perspective view from the front quarter of a flat bed, follow frame arranged for attachment to a prime mover according to the invention;

FIG. 6 is a perspective view of a cantilever follow frame according to the invention;

FIG. 7 is a partially broken-away, perspective view of a portion of a coupling mechanism mounted on a tractor for attachment of a follow frame in enlarged detail;

FIG. 8 is a perspective view of a portion of a coupling lock mounted on a follow frame for locking the follow frame to the tractor according to the invention;

FIG. 9 is a top plan view of one side of a coupling and lock mechanism according to the invention, illustrating a lock and tightening device for the trailer in the prime mover frame; and FIG. 10 is a cross-sectional view of a frame coupling and lock mechanism according to the invention.

In the illustrations one particular type of connection is shown and is described below; however, it is merely one structure which may be used for providing a rigid connection, and in effect forms a rigid, non-articulating frame for both tractor and trailer. The connecting members or couplings should have locking mechanisms which insure a tight connection between the tractor portion and the trailer portion and such a connection or lock which will not loosen under vibration and shock of road travel.

In FIGS. 1 and 2 a trailer, shown generally by numeral 10, is arranged to be coupled with a prime mover, shown generally by numeral 12. The trailer is provided with sides 14 and 15, a bottom 16, and a rear end 19. The top is enclosed by a member 17. The front of the trailer is provided with a bulkhead 18 which is of smaller dimensions than the maximum cross-section of the trailer due to a cut-out 20 arranged to fit over the wheels and a coupling deck 30 of the tractor. The tractor is provided with front and rear steerable axles for wheels 31 and 32, one or both are driven, including drive mechanism, not shown. A driver's compartment in the tractor is provided with a door 33 on one side for entrance therein and another door on the other side (not shown). The compartment is provided with necessary windshields 35 and 36 for visibility and side windows 37 for added visibility. As shown in copending application Ser. No. 550,394, filed May 16, 1966, and having a common assignee with this present application, the prime mover is provided with an undercab engine and the necessary drive, transfer case, transmission and connecting elements for the powering of the prime mover. Additional description of the same is not necessary for the present invention since it has been previously described. The front bulkhead 18 of the trailer is arranged to be mounted closely adjacent the rear bulkhead 38 of the cab section of the prime mover, with some means to provide a smooth conecting joint therebetween. A rubber grommet, for example, mounted on the prime mover and extending between the trailer and the cab may provide a smooth connection between the two units to seal any gap and reduce wind resistance. Other shields for sealing any gap may, of course, be used. The follow frame 10 is provided with a pair of axles including a wheeled front axle 21 and a wheeled rear axle 22, usually with single or dual wheels mounted thereon to support the load in the cargo section. It is desirable, in some instances, to provide a non-drive, steerable front axle for very slow forward or reverse speed and to equip the rear axle with means for retracting the same to the position shown in dashed lines when the axle 21 is used as a steerable axle. When the follow frame is disconnected from the prime mover a landing gear 25 is extended for supporting the front end. Such landing gears are conventional in the trailer art, and they may be of various types such as the wheel type, as shown at 25, or the skid type as shown at 25a in FIG. 4.

A coupling mechanism is illustrated in FIGS. 7 through 10 and it includes a channel 40, secured to a prime mover frame member 41, and a formed member 42 cooperatively providing at rack having an open top 43 and a flared end 44, for ease of entry of a coupling bar which is a part of the coupling mounted on the trailer. Two such tracks are required to form the coupling, one on each side of the coupling deck of the prime mover. A plate member 45 is arranged for connection to the coupling tracks on both sides of the tractor, and an upper plate member 46 is, likewise, secured to the coupling tracks on both sides, cooperatively forming a rigid box frame which is rigidly secured with the frame of the prime mover. The tracks on both sides of the prime mover frame accommodate a pair of coupling members mounted on the follow frame. The follow frame is provided with a pair of runners or coupling bars, each arranged to telescope in its mating track on the prime mover, and one such pair is shown in FIG. 9 ready for coupling. A pointed and elongated runner 50 is mounted on a support member 51 depending from a follow frame support plate 52 which is secured to the follow frame. The runner is provided with a pair of cam lock receiving indentations 55 and 56 on the inside thereof in position to mate with a cam lock 58 and 59, respectively, mounted on the box plate 45. The cam indents and the cams are preferably tapered so that the runner is pulled tight against the track on tightening the cams in the indents. It is understood that each of the runners includes the cam lock receiving indentations for locking both the runners into position in the coupling and further, when tapered, the cams, which are eccentric, in the tapered cam indentations locks the runners downwardly toward the prime mover frame and outwardly against the coupling channel for rigidly securing the runner in the coupling track on both sides of the follow frame. For positive control of the cam lock, a dog and pawl latch 60 is spring biased to prevent the cam lock from releasing accidentally. Further, to insure that the cam locks will not release due to vibration on movement over the road, a spring-loaded moment arm 61 is attached to the pawl latch and is held against the dog by tension of a helical spring 62 to positively hold the cam lock in the locked position. For additional safety, a safety lock pin 65 passes through opening 66 in the rear end of the track and a passage in the runner to lock the runner securely in position in the track.

Other means are, of course, available for securely locking the follow frame to the tractor in such a manner that the follow frame is rigidly secured to, and in effect becomes a part of, the frame of the tractor, forming an integrated truck and tractor. For example, the two longitudinal channel frame members on the tractor may be made so as to telescope with two longitudinal channel frame members on the trailer, and cinching pins are used to secure the frame members tightly and rigidly together.

The configuration of the follow frame shown in FIG. 4 is a closed van type, utilizing two axles and at least four wheels. A door (not shown) may be provided in the rear wall or in either or both side walls, as is conventional. Additionally, the floor may be all level with the cut-out 20, or lowered between the wheels. A modified form of follow frame is shown in FIG. 5 where a flat bed 70 is provided with an axle 71 on which is mounted at least a pair of wheels, only one of which 72 is shown, for attachment to a prime mover by means of runers 75 mounted at the front end of the follow frame on an elevated portion 76. A skid type landing gear 77 is arranged for supporting the front end of the follow frame when the tractor is not attached. For specialized purposes pillow blocks 78 may be provided on the flat bed for securing various types of cargo, for example, pipes, tanks, drums and the like.

A different type of follow frame is shown in FIG. 6 where a bed 80 is provided with runners 81 for attachment to the track of the coupling mounted on the frame of the prime mover. When rigidly secured to the coupling the follow frame is cantilevered so that the wheels of the prime mover support the entire device. With the steerable front and rear axles of the prime mover, such a vehicle is highly maneuverable and is easily adaptable for short hauls, in and around a terminal. The wheels of the prime mover, of course, may be arranged for different types of steering, depending on the use required. With the cantilever follow frame it may be highly desirable to have the two rear wheels fixed as follow wheels and the front wheels as steerable. The cantilever follow frame is particularly useful for conveying palleted goods for short distances where the follow frame may be placed on a dock for loading and/or unloading, uncoupling the prime mover as required. This provides an inexpensive and very convenient means for shipping boxes, palleted cargo, large pieces of machinery, and the like.

While the invention has been illustrated by reference to particular embodiments, there is no intent to limit the spirit or the scope of the invention to the precise details so set forth except as defined in the following claims.

We claim:

1. The combination of a self-contained prime mover having longitudinal frame members and a cab mounted thereon with a follow trailer member having longitudinal frame members arranged for releasable attachment to said prime mover; at least a pair of open top channel members mounted on the longitudinal frame members of said prime mover in general alignment therewith and each having a flared openings rearwardly thereof; at least a pair of runner members extending forwardly of said follow trailer member depending from said trailer longitudinal frame members and in position to telescope into said channel members when said trailer is moved into longitudinal alignment toward said prime mover; and means for securing each said runner member in its respective channel including means for tightening said runner members against said channel members forming a rigid coupling therebetween.

2. The combination according to claim 1 wherein said means for securing said runner members into said channel members includes at least one releasable lock pin extending through each said channel and each said telescoped runner member.

3. The combination according to claim 1 wherein said tightening means includes an eccentric cam mounted on each said channel and a cam mating indent on each said runner member into which said cam seats for tightening said members together, and means for retaining said cams in tightened position against accidental release.

4. The combination of claim 1 wherein said channel members and said runner members are an effective, elongated overlap of the longitudinal frame members of said prime mover and said trailer member preventing relative twisting and torsional movement between said two frames.

5. The combination according to claim 1 wherein said follow trailer member is of the van type and the front bulkhead thereof is closely adjacent the cab of said prime mover, and closure means arranged to close any gap between said cab and said trailer member.

6. The combination according to claim 1 wherein said follow trailer member includes at least one wheeled axle for supporting a portion of said follow frame.

7. The combination according to claim 1 wherein said follow trailer member is wheelless and is cantilevered rearwardly and outwardly from said prime mover.

References Cited

UNITED STATES PATENTS

| 1,155,713 | 10/1915 | Eldridge | 180—12 |
| 1,229,082 | 6/1917 | Hollis | 180—12 |
| 1,803,866 | 5/1931 | Patterson | 180—14 |
| 1,855,642 | 4/1932 | Masury | 180—12 |
| 2,131,083 | 9/1938 | Winn. | |
| 2,291,626 | 8/1942 | Huber | 180—14 |
| 2,724,611 | 11/1955 | Robertson | 180—11 X |

FOREIGN PATENTS

| 453,901 | 9/1936 | Great Britain. |
| 928,000 | 11/1947 | France. |

A. HARRY LEVY, *Primary Examiner.*